United States Patent
Velazquez et al.

(10) Patent No.: US 10,737,551 B2
(45) Date of Patent: Aug. 11, 2020

(54) VEHICLE AIR HANDLING SYSTEM

(71) Applicant: Nissan North America, Inc., Franklin, TN (US)

(72) Inventors: Xavier Ramiro Velazquez, Mexico City (MX); Janeth Jhovana Gonzalez Arriaga, Toluca (MX)

(73) Assignee: Nissan North America, Inc., Franklin, TN (US)

( * ) Notice: Subject to any disclaimer, the term of this patent is extended or adjusted under 35 U.S.C. 154(b) by 357 days.

(21) Appl. No.: 15/827,863

(22) Filed: Nov. 30, 2017

(65) Prior Publication Data

US 2019/0160907 A1    May 30, 2019

(51) Int. Cl.
*B60H 1/00* (2006.01)
*B60H 1/24* (2006.01)

(52) U.S. Cl.
CPC ......... *B60H 1/008* (2013.01); *B60H 1/00028* (2013.01); *B60H 1/00821* (2013.01); *B60H 1/00864* (2013.01); *B60H 1/248* (2013.01); *B60H 2001/00178* (2013.01)

(58) Field of Classification Search
CPC ............. F24F 3/1607; F24F 2011/0004; F24F 2011/0005; F24F 2110/64; B60H 1/008; B60H 1/00028; B60H 1/00821; B60H 1/248; B60H 2001/00178
USPC ........................................... 454/69–165, 187
See application file for complete search history.

(56) References Cited

U.S. PATENT DOCUMENTS

| | | | |
|---|---|---|---|
| 4,971,026 A | 11/1990 | Fineblum | |
| 7,338,357 B2 | 3/2008 | Voit, II et al. | |
| 8,057,288 B2 | 11/2011 | Konet | |
| 8,109,108 B2 | 2/2012 | Nagayama et al. | |
| 8,347,452 B2 | 1/2013 | Maehata et al. | |
| 8,641,490 B2 | 2/2014 | Eisenhour | |
| 8,733,428 B2 | 5/2014 | Nakajima | |
| 9,428,035 B2 | 8/2016 | Eisenhour | |
| 9,434,235 B2 | 9/2016 | Eisenhour | |
| 2007/0151278 A1* | 7/2007 | Jarvis | F24F 5/0035 62/310 |
| 2015/0273975 A1* | 10/2015 | Kim | B60H 1/00828 454/139 |

(Continued)

FOREIGN PATENT DOCUMENTS

CN    204003100 U    12/2014

Primary Examiner — Vivek K Shirsat
Assistant Examiner — Ko-Wei Lin
(74) Attorney, Agent, or Firm — Global IP Counselors, LLP

(57) ABSTRACT

A vehicle air handling system includes an air duct housing, a particulate sensor, a first air blower and an electronic controller. The air duct housing has an air inlet and a passenger compartment vent. The particulate sensor is configured to detect a particulate level of particulates in the air duct housing. The first air blower is disposed in the air duct housing to move air within the air duct housing. The electronic controller is operatively coupled to the particulate sensor and the first air blower. The electronic controller is configured to operate the first air blower to reverse an air direction of the first air blower away from the passenger compartment vent upon detection of the particulate level of the particulates in the air duct housing being equal to or greater than a predetermined particulate threshold level in the air duct housing.

20 Claims, 6 Drawing Sheets

(56) References Cited

U.S. PATENT DOCUMENTS

2016/0176261 A1\* 6/2016 Khorana ............... B60H 1/008
 165/248
2017/0197493 A1 7/2017 Paranhos et al.

\* cited by examiner

VEHICLE AIR HANDLING SYSTEM

FIELD OF THE INVENTION

The present invention generally relates to a vehicle air handling system. More specifically, the present invention relates to a vehicle air handling system including a particulates removal feature for removing particulates in ductwork of the vehicle air handling system.

BACKGROUND INFORMATION

Most vehicles include a climate control system which allows a passenger of the vehicle to select between a heating state and a cooling state for the vehicle interior. Typical climate control systems are part of a heating, ventilation and air conditioning unit of a vehicle that include at least one air blower for moving air through an air circulation network.

SUMMARY

In view of the state of the known technology, one aspect of the present disclosure is to provide a vehicle air handling system comprising an air duct housing, a particulate sensor, a first air blower and an electronic controller. The air duct housing has an air inlet and a passenger compartment vent. The particulate sensor is configured to detect a particulate level of particulates in the air duct housing. The first air blower is disposed in the air duct housing to move air within the air duct housing. The electronic controller is operatively coupled to the particulate sensor and the first air blower. The electronic controller is configured to operate the first air blower to reverse an air direction of the first air blower away from the passenger compartment vent upon detection of the particulate level of the particulates in the air duct housing being equal to or greater than a predetermined particulate threshold level in the air duct housing.

In view of the state of the known technology, a second aspect of the present disclosure is to provide a vehicle air handling system comprising an air duct housing, a particulate sensor, an exhaust duct blower and an electronic controller. The air duct housing has an air inlet and a passenger compartment vent. The particulate sensor is configured to detect a particulate level of particulates in the air duct housing. The exhaust duct blower is disposed in the air duct housing to draw air through the air duct housing and out an exhaust duct of the air duct housing. The electronic controller is operatively coupled to the particulate sensor and the exhaust duct blower. The electronic controller device is configured to operate the exhaust duct blower upon detection the particulate level of the particulates in the air duct housing being equal to or greater than a predetermined particulate threshold level in the air duct housing.

In view of the state of the known technology, a third aspect of the present disclosure is to provide a vehicle air handling system comprising an air duct housing, a cowl box, a first air blower and an electronic controller. The air duct housing has an air inlet and a passenger compartment vent. The cowl box includes a cowl body panel opening that is aligned with the air inlet. The first air blower is disposed in the air duct housing to move air within the air duct housing. The electronic controller is operatively coupled to the first air blower. The electronic controller is configured to operate in a first mode in which the first air blower pulls air from the cowl body panel opening through the air duct housing to the passenger compartment. The electronic controller is configured to operate in a second mode in which the first air blower pulls air from the passenger compartment through the air duct housing to the cowl body panel opening.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
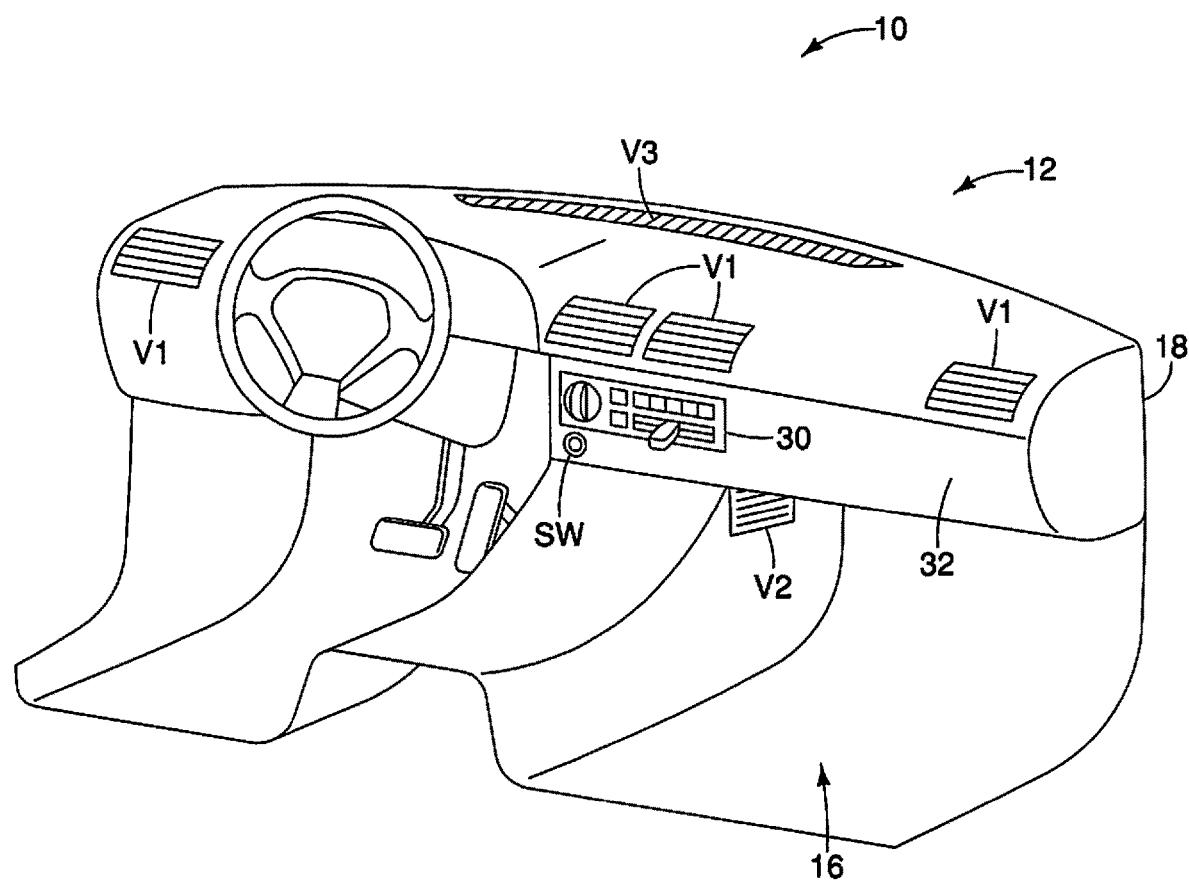
FIG. 1 is a perspective view of a portion of a vehicle passenger compartment of a vehicle having a vehicle air handling system with a plurality of passenger compartment vents in accordance with a first illustrated embodiment.
Figure 2:
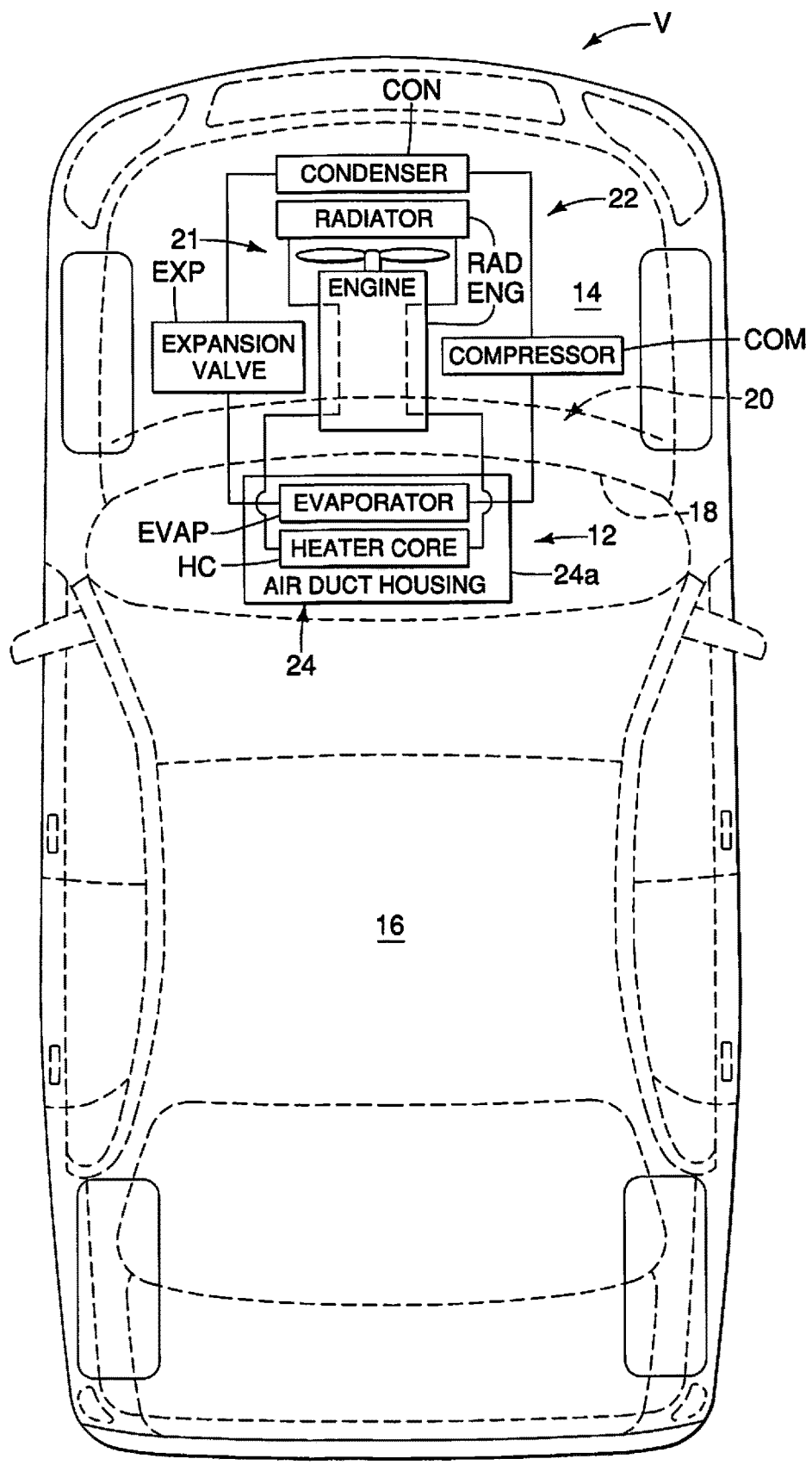
FIG. 2 is a schematic view of the vehicle illustrated in FIG. 1 showing a heating circuit and a cooling circuit of the vehicle air handling system.
Figure 3:
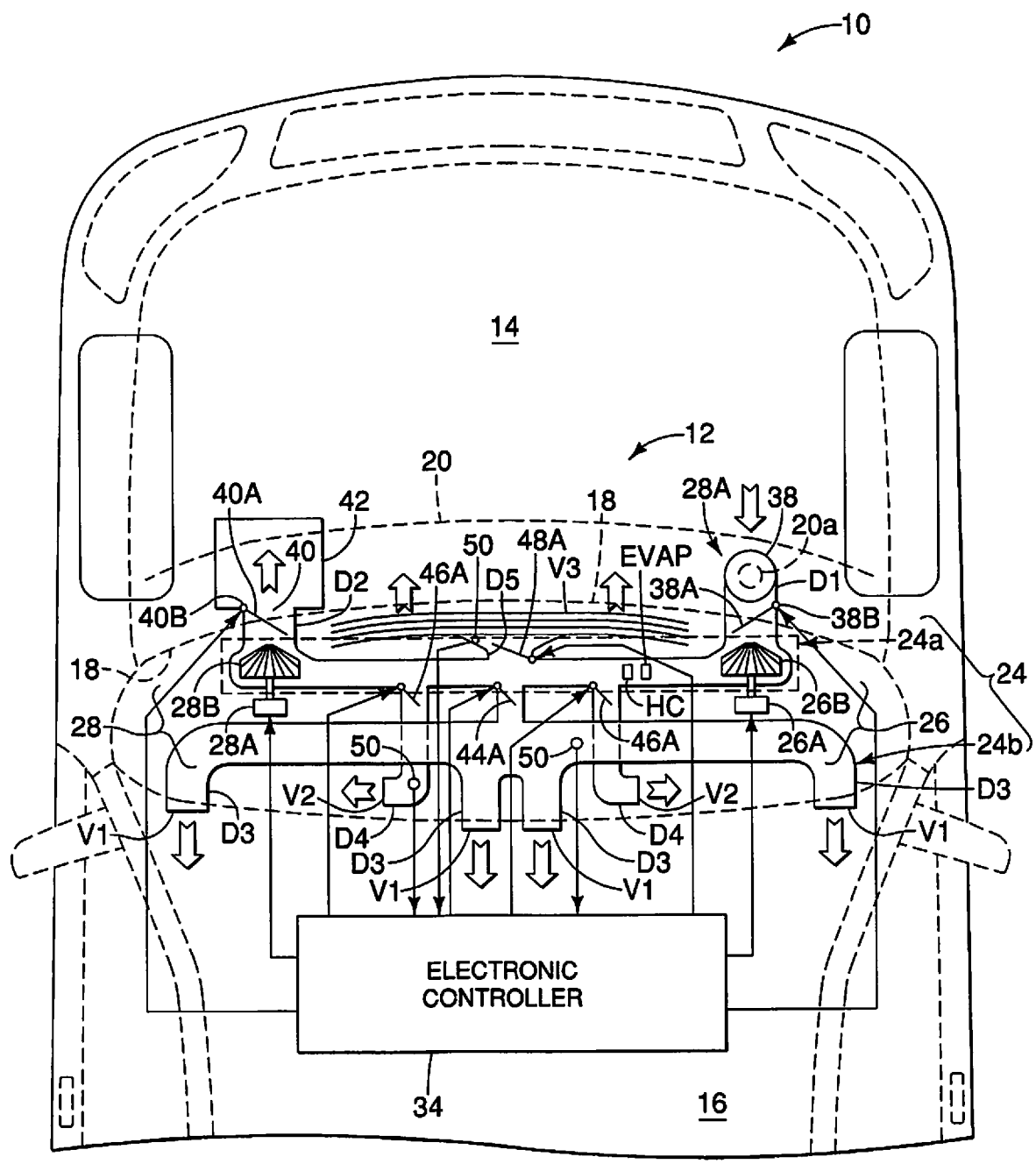
FIG. 3 is a schematic view of the vehicle illustrated in FIGS. 1 and 2 with ducts of the vehicle air handling system being diagrammatically shown.

Referring now to FIG. 1, a portion of a vehicle 10 is diagrammatically illustrated that includes a vehicle air handling system 12 in accordance with one illustrated embodiment. As shown in FIGS. 2 and 3, the vehicle 10 includes an engine compartment 14 and a passenger compartment 16 separated by a vehicle dash wall 18. As shown, the vehicle 10 also includes a cowl box 20 disposed forward of the dash wall 18, and an engine ENG disposed in the engine compartment 14. In the illustrated embodiment, the vehicle air handling system 12 is provided substantially in the passenger compartment 16 of the vehicle 10. In this disclosure, the components of the vehicle air handling system 12 to be described are diagrammatically or schematically illustrated. However, it will be apparent to those skilled in the vehicle field that the exact configurations of the components will vary depending on the particular vehicle.

In particular, the vehicle air handling system 12 is part of a climate control system of the vehicle 10, and is operable between a first (non-cleaning) mode, a second (cleaning or vacuuming) mode, a first alternative cleaning mode and a second alternative cleaning mode. As seen in FIG. 2, the vehicle 10 includes a conventional heating circuit 21 and a conventional cooling or refrigerant circuit 22 that together with the vehicle air handling system 12 form a heating, ventilation and air conditioning unit ("HVAC unit"). The heating circuit 21 basically includes the engine ENG together with a radiator RAD and a heater core HC. The cooling or refrigerant circuit 22 basically includes a compressor COM, a condenser CON, expansion valve EXP and an evaporator EVAP.

In the illustrated embodiment, as seen in FIG. 2, the vehicle air handling system 12 includes an air duct housing 24. The air duct housing 24 includes a main body 24a that houses the heater core HC and the evaporator EVAP. In this way, the air passing through the main body 24a of the air duct housing 24 is heated or cooled before the air is conveyed to the passenger compartment 16.

In the illustrated embodiment, as seen in FIG. 3, the vehicle air handling system 12 further includes a first air (intake) blower 26 and a second air (outlet) blower 28, as will be further discussed below. Preferably, the first and second air blowers 26 and 28 are arranged in the main body 24a of the air duct housing 24. The first air blower 26 is operated in a first or forward direction to provide fresh air to the passenger compartment 16 and/or recirculate air in the passenger compartment 16. The air duct housing 24 further includes a ductwork 24b. In the illustrated embodiment, as seen in FIG. 3, the ductwork 24b includes a plurality of ducts D1 to D5. The ductwork 24b is preferably fixedly attached to the main body 24a of the air duct housing 24. Thus, the main body 24a and the ductwork 24b are typically made of several individual pieces that are fixed together for conveying air to the passenger compartment 16.

As seen in FIG. 1, the vehicle air handling system 12 further includes a set of operator controls 30 (i.e., HVAC controls) for controlling the operations of the climate control system in a conventional manner. The operator controls 30 are located in the passenger compartment 16, preferably on a dash instrument panel 32 of the vehicle 10. The operator controls 30 typically will include an air conditioning "ON/OFF" switch, a temperature control, a mode door control, and a fan speed control for the first air blower 26. In the illustrated embodiment, the operator controls 30 can also include a switch for manually controlling the first air blower 26 and/or the second air blower 28 of the vehicle air handling system 12 between the first (non-cleaning mode) and the second (cleaning) mode, as will be further discussed below.

In particular, in the illustrated embodiment, the vehicle air handling system 12 includes a vacuuming function configured to move air in the ducts D1 to D5 to vacuum and remove particulates out of the ducts D1 to D5. In the illustrated embodiment, the vehicle air handling system 12 includes an electronic controller 34 that is configured to operate the first air blower 26 in the first (non-cleaning) mode and the second (cleaning) mode. In the illustrated embodiment, the first (non-cleaning) mode refers to a condition in which the electronic controller 34 operates the first air blower 26 in the first or forward direction such that fresh (outside) air is pulled through a cowl body panel opening 20a of the cowl box 20 into the air duct housing 24 and then into the passenger compartment 16. In the first (non-cleaning) mode, the fresh air is pulled into the air duct housing 24 in an air intake direction shown by the block arrows in FIG. 3. Thus, in the illustrated embodiment, the first (non-cleaning) mode is a conventional mode of the vehicle during operation of the vehicle air handling system 12. In the illustrated embodiment, the second (cleaning) mode refers to a condition in which the electronic controller 34 operates the first air blower 26 in a second or reverse direction to pull air from the passenger compartment 16 into and through the air duct housing 24 to the cowl body panel opening 20a to clean the vehicle ducts D1 to D5, as will be further discussed below. In the illustrated embodiment, a first alternative cleaning mode refers to a condition in which the electronic controller 34 operates the second air blower 28 in a direction to pull air from the passenger compartment 16 into and through the air duct housing 24 to clean at least one of the vehicle ducts D1 to D5, as will be further discussed below.

Preferably, as will be further discussed below, the electronic controller 34 is configured to operate in the second or third (cleaning) mode upon activation of a vehicle ignition switch SW and/or determining that a predetermined time period has lapsed since operating the second or third (cleaning) mode. Additionally, as will be further discussed below, the electronic controller 34 is configured to operate the second or third (cleaning) mode upon detection of the particulate level of the particulates in the air duct housing 24 being equal to or greater than a predetermined particulate threshold level in the air duct housing 24. As stated, the vehicle air handling system 12 of the illustrated embodiment is further operable between a plurality of alternative cleaning modes once the second (cleaning) mode is in operation, as will be explained below.

Referring now primarily to FIG. 3, the vehicle air handling system 12 of the illustrated embodiment will be further discussed. As stated, the air duct housing 24 includes the ducts D1 to D5 that are attached to the main body 20a of the air duct housing 24. In the illustrated embodiment, the ducts D1 to D5 can be more specifically be referred to as an air intake duct D1, an exhaust duct D2, a plurality of panel ducts D3, a pair of floor ducts D4 and a defrost duct D5. The air duct housing 24 includes a plurality of passenger compartment vents V1, V2 and V3 disposed at outlet ends of the ducts D1 to D5 as discussed below. The passenger compartment vents V1, V2 and V3 can each be manually operated between an open position and a closed position as well as set to any position between the open position and the closed position in a conventional manner. Alternatively, or in addition to the manually operation, the passenger compartment vents V1, V2 and V3 can be electrically operated by the electronic controller 34 and/or by a passenger using the operator controls 30. In the illustrated embodiment, each of the passenger compartment vents V1, V2 and V3 can be considered an air outlet point for one of the ducts D3 to D5 of the vehicle air handling system 12 when air is pulled into the air duct housing 24 in a conventional manner using the first air blower 26. In particular, the vehicle air handling system 12 comprises at least one panel vent V1 connected to the panel duct D3, at least one floor vent V2 connected to the floor duct D4, and at least one defrost vent V3 connected to the defrost duct D5. More specifically, as illustrated in FIGS. 1 and 3, the vehicle 10 includes four of the panel vents V1, two of the floor vents V2 and one defrost vent V3. It will be apparent to those in the vehicle field from this disclosure that the vehicle air handling system 12 can include a various number of each type of vents V1, V2 and V3 to accommodate additional and/or fewer ducts D3 to D135 as needed and/or desired.

As seen in FIG. 3, the air intake duct D1 has an air inlet 38 that directly intakes fresh air from outside of the vehicle 10. In the illustrated embodiment, the air inlet 38 can be considered an air inlet of the air duct housing 24. Also in the illustrated embodiment, as best shown in FIG. 3, the air inlet 38 is preferably aligned with the cowl body panel opening 20a of the cowl box 20. In other words, in the illustrated embodiment, the air inlet 38 is an opening disposed in the cowl box 20. The air inlet 38 includes an air intake door 38A and an air intake door actuator 38B. The air intake door actuator 38B is configured to operate the air intake door 38A by the electronic controller 34 between an open position and a closed position as well as set to any position between the open position and the closed position, as will be further discussed below. The first air blower 26 is disposed in the air duct housing 24. Preferably, the first air blower 26 is disposed adjacent the air inlet 38. The first air blower 26 is disposed in the air duct housing 24 to move air within the air duct housing 24 by intaking air from the vehicle exterior via the air inlet 38. Thus, in the illustrated embodiment, the first air blower 26 is considered an air intake blower. As shown, the evaporator EVAP and the heater core HC are disposed downstream of the air inlet 38 with respect to an air intake direction. In the illustrated embodiment, the exhaust duct D2 has an exhaust outlet 40 that is disposed downstream of the air inlet 38 with respect to the air intake direction. The exhaust outlet 40 includes an exhaust door 40A and an exhaust door actuator 40B. The exhaust door actuator 40B is operable by the electronic controller 34 between an open position and a closed position as will be discussed below.

As shown, the exhaust outlet 40 is also disposed downstream of the evaporator EVAP and the heater core HC with respect to the air intake direction illustrated by the block arrows in FIG. 3. Thus, the exhaust duct D2 is disposed downstream of the air inlet 38 with respect to the air intake direction. Although the exhaust outlet 40 is shown as being forward of the vehicle dash wall 18, preferably, the exhaust outlet 40 is formed in the vehicle dash wall 18. In other words, the exhaust outlet 40 is an opening in the vehicle dash wall 18 or an opening in the cowl box 20 and the exhaust duct D2 is connected to the vehicle dash wall 18. Alternatively, as illustrated, the exhaust duct D2 of the illustrated embodiment pass through an additional opening of the vehicle dash wall 18. Also, although the exhaust door 40A is shown forward of the vehicle dash wall 18, preferably, the exhaust door 40A is disposed rearward of the vehicle dash wall 18. As shown, the second air blower 28 is disposed in the exhaust duct D2. The vehicle air handling system 12 further comprises a particulate storage 42 that is disposed adjacent the exhaust outlet 40. In the illustrated embodiment, the second air blower 28 is considered an exhaust duct blower. The second air blower 28 and the particulate storage 42 will be further discussed below.

In the illustrated embodiment, the vehicle air handling system 12 has the capability of selectively closing and opening the D1 to D5 to clean the air duct housing 24. However, if needed and/or desired, the vehicle air handling system 12 can be simplified such that the air duct housing 24 has at least one mode door and at least one mode door actuator configured to operate the at least one mode door for cleaning the air duct housing 24. Thus, the electronic controller 34 is configured to selectively operate the at least one mode door actuator to selectively vacuum particulates from the panel ducts D3, the floor ducts D4 and the defrost duct D5.

Figure 4:
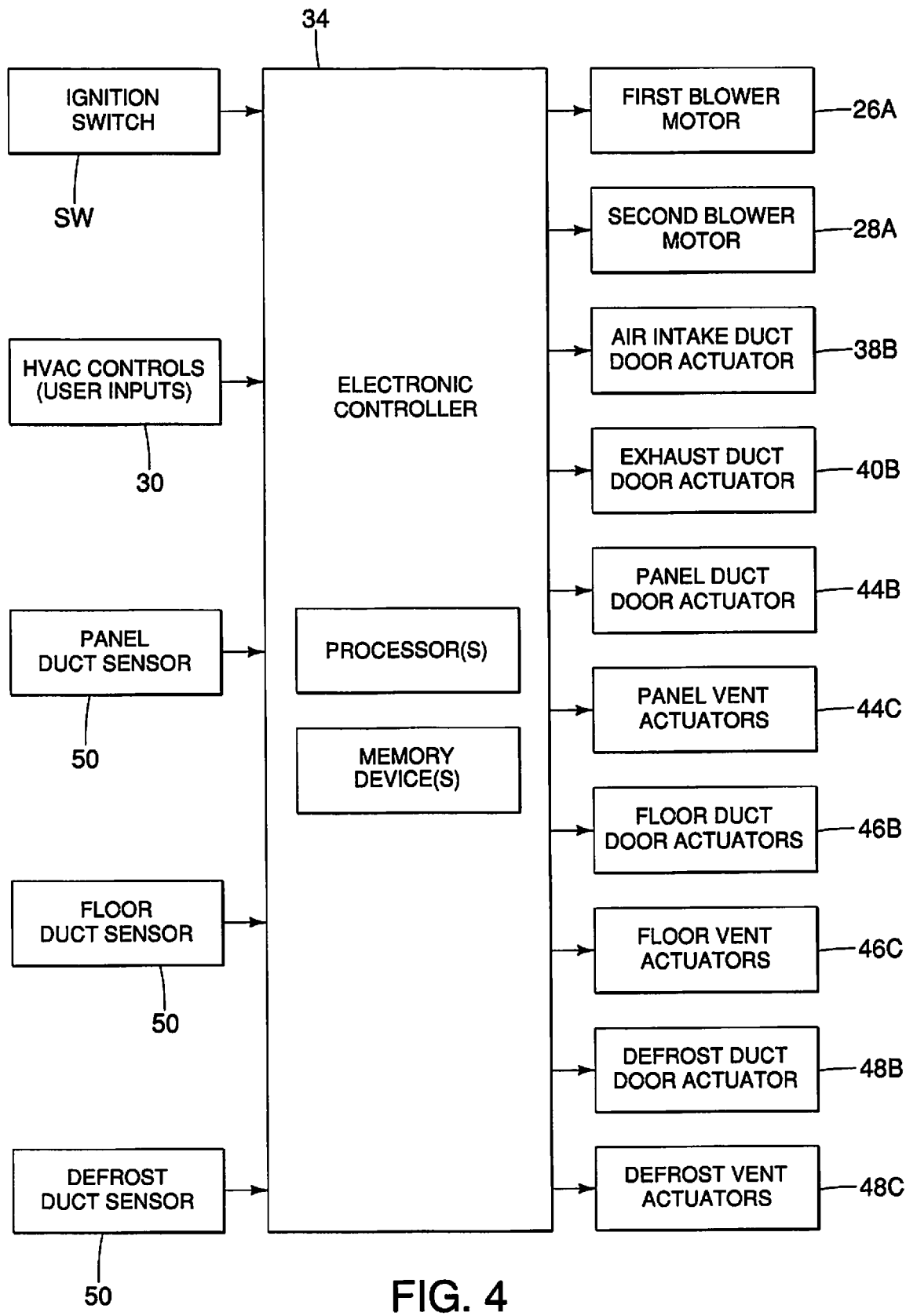
FIG. 4 is a diagrammatic block diagram of an electronic control system of the vehicle air handling system illustrated FIGS. 1 to 3.

In this disclosure as illustrated in FIGS. 3 and 4, the panel ducts D3 each include a panel duct door 44A (FIG. 3) and a panel duct door actuator 44B (FIG. 4) that operates the panel duct doors 44A. The floor ducts D4 each has a floor duct door 46A (FIG. 3) and a floor duct door actuator 46B (FIG. 4) configured to operate the floor duct door 46A. Additionally, the defrost duct D5 includes a defrost duct door 48A (FIG. 3) and a defrost duct door actuator 48B (FIG. 4) configured to operate the defrost duct door 48A. The panel duct door actuators 44B, the floor duct door actuators 46B and the defrost duct door actuator 48B are mode doors that are operatively connected to the electronic controller 34. In the illustrated embodiment, the electronic controller 34 selectively operates the mode doors 44A, 46A and 48A to selectively vacuum particulates from the panel ducts D3, the floor ducts D4 and the defrost duct D5.

In the illustrated embodiment, while the panel duct doors 44A, the floor duct doors 44A and the defrost duct door 48A are illustrated as separate doors each having an actuator, it will be apparent to those skilled in the vehicle field that the vehicle air handling system 12 can include only a single mode door operable by a single mode door actuator to selectively close off the panel ducts D3, the floor ducts D4 and the defrost duct D5. Thus, in the illustrated embodiment, the panel duct doors 44A, the floor duct doors 46A and the defrost duct door 48A can each be considered as "the mode door." Similarly, the panel duct door actuators 44B, the floor duct door actuators 46B and the defrost duct door actuator 48B can each be considered as "the mode door actuator."

In the illustrated embodiment, as seen in FIG. 4, the panel vents V1 can be opened and closed by a panel vent actuator 44C that is operably connected to the electronic controller 34. The floor vents V2 can be opened and closed by a floor vent actuator 46C that is operably connected to the electronic controller 34. Additionally, the defrost vent V3 can be opened and closed by a defrost vent actuator 48C that is operably connected to the electronic controller 34. Operation of the panel, floor and defrost vent actuators 44C, 46C and 48C by the electronic controller 34 will be further discussed below.

In the illustrated embodiment, the vehicle air handling system 12 further includes a plurality of particulate sensors 50 disposed in the ducts D1 to D5. Preferably, as shown, the particulate sensors 50 are disposed adjacent the passenger compartment vents V1, V2 and V3 to detect a particulate level of particulates in the ducts D1 to D5, as will be further described below. Thus, the vehicle air handling system 12 further includes at least one additional particulate sensor 50 each disposed adjacent one of the passenger compartment vents V1, V2 and V3. However, in a simplified version of the vehicle air handling system 12, only a single particulate sensor can be used to detect the particulate level of particulates in the ducts D1 to D5.

In the illustrated embodiment, the electronic controller 34 is operatively coupled to each of the particulate sensors 50. In the illustrated embodiment, the electronic controller 34 is configured to control the particulate sensors 50 to initiate a sensing cycle upon activation of the vehicle ignition, as will be further explained below. The electronic controller 34 is further operatively coupled to the air intake door actuator 38B and the exhaust door actuator 40B to selectively operate the air intake door 38A and the exhaust door 40A in accordance with the first, second and third modes, as will be further discussed below. In the illustrated embodiment, the electronic controller 34 is further operatively coupled to the mode doors (or a single mode door) to selectively vacuum portions of the air duct housing 24, as will be further explained below.

The particulate sensors 50 will now be discussed in greater detail. In the illustrated embodiment, the particulate sensors 50 are configured to detect a particulate level of particulates in the air duct. As shown, the vehicle air handling system 12 has one of the particulate sensors 50 disposed in each of the panel, floor and defrost ducts D3 to D5. Alternatively, the particulate sensors 50 can be disposed at one or more of the panel, floor and/or defrost vents V1, V2 and V3. It will be apparent to those skilled in the vehicle field from this disclosure that the vehicle air handling system 12 can include additional or fewer particulate sensors 50 disposed in the ducts D1 to D5 of the vehicle air handling system 12 to measure particulates, as needed and/or desired. In the illustrated embodiment, each of the particulate sensors 50 are identical except for their placement in the vehicle 10.

In the illustrated embodiment, the particulate sensors 50 can be considered dust sensors or air quality sensors. In particular, the particulate sensors 50 are configured to measure the dust concentration in the atmosphere within a sensing zone. For example, the particulate sensors 50 can measure a Particulate Matter level (PM level) in the air by counting the Low Pulse Occupancy time (LPO time) in given time unit. The LPO time is proportional to PM concentration. Alternatively, the particulate sensors 50 can be optical air quality sensors for sensing dust particles. For example, the particulate sensors 50 can include an infrared emitting diode and a phototransistor that are diagonally arranged to detect the reflected light of dust in air.

The first (intake) air blower 26 will now be discussed in greater detail. As previously stated and best shown in FIG. 3, the first air blower 26 is disposed in the air duct housing 24 in or adjacent to the air inlet 38 to move air within the air duct housing 24. The first air blower 26 is an HVAC blower that includes a reversible rotary motor 26A and a fan 26B (e.g., a wheel or cage). The motor 26A is operatively connected to the electronic controller 34 so that the first air blower 26 is operable by the electronical controller 34. In particular, the electronic controller 34 can activate the motor 26A by controlling a voltage applied to the motor 26A to spin the motor 26A, which spins the fan 26B. In the illustrated embodiment, the electronic controller 34 can further control a rotational blowing direction of the fan 26B. For example, when the fan 26B rotates in a first rotational direction (e.g., clockwise) the air is pulled into the air duct housing 24 from the air inlet 38 in the traditional air intake direction shown by the block arrows in FIG. 3. When the fan 26B rotates in a second rotational direction (e.g., counter-clockwise) air is pulled into the air duct housing 24 from the passenger compartment vents V1, V2 and V3 in an opposite direction and air is taken into the air duct housing 24 from the passenger compartment vents V1, V2 and V3. In the illustrated embodiment, the electronic controller 34 operates the first air blower 26 in accordance with the second (cleaning) mode, as will be further discussed below.

The second air blower 28 is preferably identical to the first air blower 26 in structure except that the second air blower 28 is disposed in or adjacent the exhaust duct D2. Thus, the second air blower 28 includes a reversible rotary motor 28A and a fan 28B (e.g., a wheel or cage). Preferably, in the illustrated embodiment, the second air blower 28 can pull fifty percent more air CFM (cubic feet per minute) than the first air blower 26 to optimize vacuuming performance. The second air blower 28 is also operatively coupled to the electronic controller 34 to operate the second air blower 28 to expel air through the exhaust duct D2 and out the exhaust outlet 40. In the illustrated embodiment, the electronic controller 34 operates the second air blower 28 in accordance with the first alternative cleaning mode, as will be further discussed below. Due to the similarity between the first and second air blowers 26 and 28, the second air blower 28 will not be further discussed herein.

As seen in FIG. 3, the particulate storage 42 is disposed adjacent the exhaust outlet 40 of the exhaust duct D2. Preferably, in the illustrated embodiment, the particulate storage 42 is a filter that can be serviceable every ten thousand miles. Alternatively, the particulate storage 42 can be a container configured to receive and store particulates expelled through the exhaust outlet 40. In the illustrated embodiment, particulates are expelled to the particulate storage 42 in accordance with the first alternative cleaning mode, as will be further discussed below.

The electronic controller 34 will now be further discussed with reference to FIGS. 3 and 4. The electronic controller 34 includes a microcomputer with a control program that controls the particulate sensors 50. The electronic controller 34 further selectively controls the first and/or second air blowers 26 and 28 and the mode door(s) in accordance with the processes depicted in the flow charts of FIGS. 5 and 6. While not shown, the electronic controller 34 further includes an input interface circuit for receiving input signals and an output interface circuit for outputting control signals. The electronic controller 34 further includes data storage such as a ROM (Read Only Memory) device and a RAM (Random Access Memory) device for storing the various operating modes (e.g., the cleaning and non-cleaning modes) and additional operational processes of the vehicle air handling system 12. It will be apparent to those skilled in the vehicle field from this disclosure that the precise structure and algorithms for the electronic controller 34 can be any combination of hardware and software that will carry out the functions of the present invention.

As seen in FIG. 4, the electronic controller 34 is operatively connected to an ignition switch SW and the particulate sensors 50 (i.e., the panel duct sensor, the floor duct sensor and the defrost duct sensor). In particular, the electronic controller 34 receives input signals from these components. The electronic controller 34 is configured to activate the particulate sensors 50 to begin detecting particulates upon activation of the ignition switch SW. Alternatively or additionally, the electronic controller 34 is configured to activate the particulate sensors 50 to begin detecting particulates upon a user input signal via operation of the HVAC controls.

The electronic controller 34 is configured to output an electronic signal to the first and second blower motors 26A and 28A to activate the first and second air blowers 26 and 28. The electronic controller 34 is further configured to output an electronic signal to the air intake door actuator 38B to selectively open and close the air inlet 38. The electronic controller 34 is configured to output an electronic signal to the exhaust door actuator 40B to selectively open and close the exhaust outlet 40. In the same way, the electronic controller 34 is configured to output an electronic signal to the mode door actuator (e.g., the panel duct door actuator 44B, the floor duct door actuator 46B, the defrost duct door actuator 48B in FIG. 4) to selectively open and close the ducts D3 to D5, and to the passenger vent actuators 44C, 46C and 48C to selectively open and close the passenger compartment vents V1, V2 and V3 in accordance with the second (cleaning) mode, as well as the first and second alternative cleaning modes.

The second (cleaning) mode will now be discussed with reference to FIG. 5. Basically, in the second (cleaning) mode, the electronic controller 34 reverses a typical rotational direction of the first air blower 26 to reverse the air intake direction in the air duct housing 24. In other words, the electronic controller 34 operates the first air blower 26 to reverse the rotational direction of the first air blower 26 to intake air from the passenger compartment vents V1, V2 and V3 rather than through the air inlet 38. In the second (cleaning) mode, particulates that are vacuumed by the first air blower 26 are expelled through the air inlet 38.

Preferably, when the ignition switch SW is operated to turn on the engine ENG, the particulate sensors 50 automatically conduct a sensing cycle. Upon receiving an input from the ignition switch SW that the engine has been turned ON, the electronic controller 34 determines in step S501 whether a predetermined time period (e.g., one day, two days, etc.) has elapsed. In the illustrated embodiment, the predetermined time period can refer to the time period since the engine was last turned ON. Alternatively, the predetermined time period can refer to the time period since the ducts D1 to D5 were vacuumed previously. If the electronic controller 34 determines the predetermined time period has not elapsed (i.e., NO), then the electronic controller 34 activates the particulate sensors 50 in step S502 to determine whether a particulate level of particulates have been detected above a predetermined particulate threshold level. In the illustrated embodiment, the vehicle air handling system 12 begins in the first (non-cleaning) mode or in an OFF condition. If the electronic controller 34 determines that the particulate level of particulates has not been detected above the predetermined particulate threshold level in step S502, then the vehicle air handling system 12 stays in the first (non-cleaning) mode or in the OFF condition. However, if the electronic controller 34 determines in step S501 that the predetermined time period has elapsed, or determines in step S502 that the particulate level has been detected above the predetermined particulate threshold level, then the vehicle air handling system 12 starts the second (cleaning) mode.

In the second (cleaning) mode, the electronic controller 34 determines whether the first air blower 26 is ON via detecting the motor 26A in step S503. If in step S503, the electronic controller 34 determines that the first air blower 26 is ON, the electronic controller 34 deactivates the first air blower 26 in step S504. The electronic controller 34 can then optionally close the passenger compartment vents V1, V2 and V3 in step S505. As previously stated, in the second (cleaning) mode, the passenger compartment vents V1, V2 and V3 are considered air inlets in the second (cleaning) mode. Thus, the passenger compartment vents V1, V2 and V3 can be partially closed to increase the speed of the air flow in the ducts D1 to D05 during vacuuming. As previously stated, the electronic controller 34 closes the passenger compartment vents V1, V2 and V3 via actuation of the defrost vent, the floor vent and the panel vent actuators 32C, 34C and 36C. In the illustrated embodiment, the passenger compartment vents V1, V2 and V3 are optionally closed approximately 75 percent. Alternatively, one or more of the passenger compartment vents 32 can be closed to increase airflow through the remaining open the passenger compartment vents 32. However, it will be apparent to those skilled in the vehicle field from this disclosure that the passenger compartment vents V1, V2 and V3 can be closed at various degrees to increase the speed of air flow to vacuum the vehicle ducts D1 to D5 as needed and/or desired. It will be further apparent to those skilled in the vehicle field from this disclosure that the passenger compartment vents V1, V2 and V3 should be kept partially open so that the passenger compartment vents V1, V2 and V3 can operate as air inlets during vacuuming. As stated, step S505 is optional as some vehicles do not include electronic vents. Thus, step S505 can be skipped.

In step S506, the electronic controller 34 preferably closes the exhaust door 40A via actuation of the exhaust door actuator 40B to increase the air flow in the ducts D1 to D5. In step S507, the electronic controller 34 outputs a control signal to the first air blower motor 26A to activate the first air blower 26 to move air in the second rotational direction such that air is taken through the passenger compartment vents V1, V2 and V3 and expelled through the air inlet 38. After a predetermined period (can be factory set), the electronic controller 34 deactivates the first air blower 26 in step S507. However, if the electronic controller 34 determines in step S503 that the first air blower 26 is not ON (i.e., the motor 26A is OFF), then the electronic controller 34 can proceed directly to step S505 as discussed.

Figure 5:
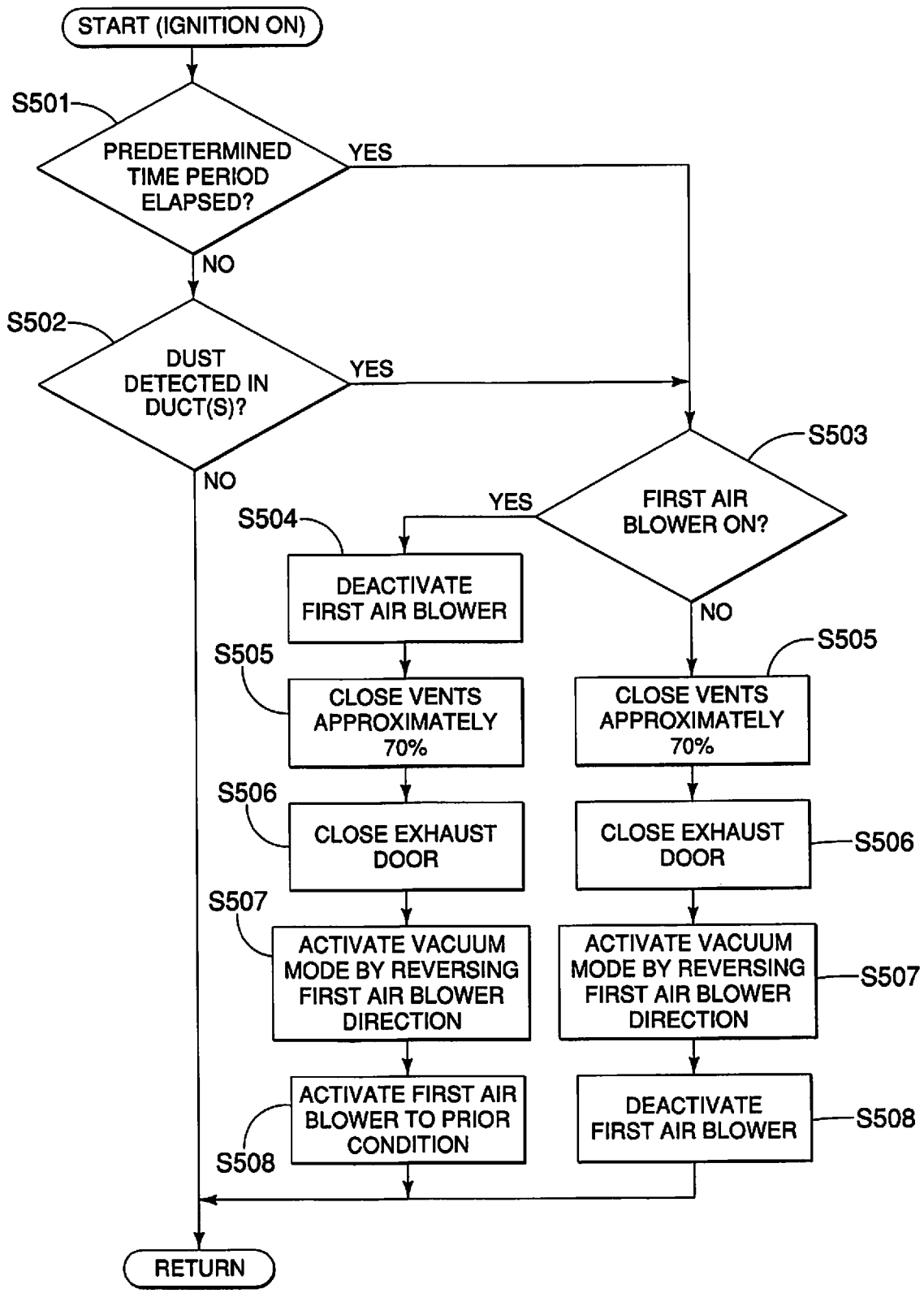
FIG. 5 is a flow chart of a cleaning or vacuuming mode executed by an electronic controller of an electronic control system of the vehicle air handling system illustrated FIG. 4.

While the flowchart of FIG. 5 shows the second (cleaning) mode as vacuuming of all ducts D1 to D5 with the first air blower 26 simultaneously, the vehicle air handling system 12 can sequentially close off portions of the ducts D3 to D5 to conduct sequential vacuuming, as will be further discussed.

Figure 6:
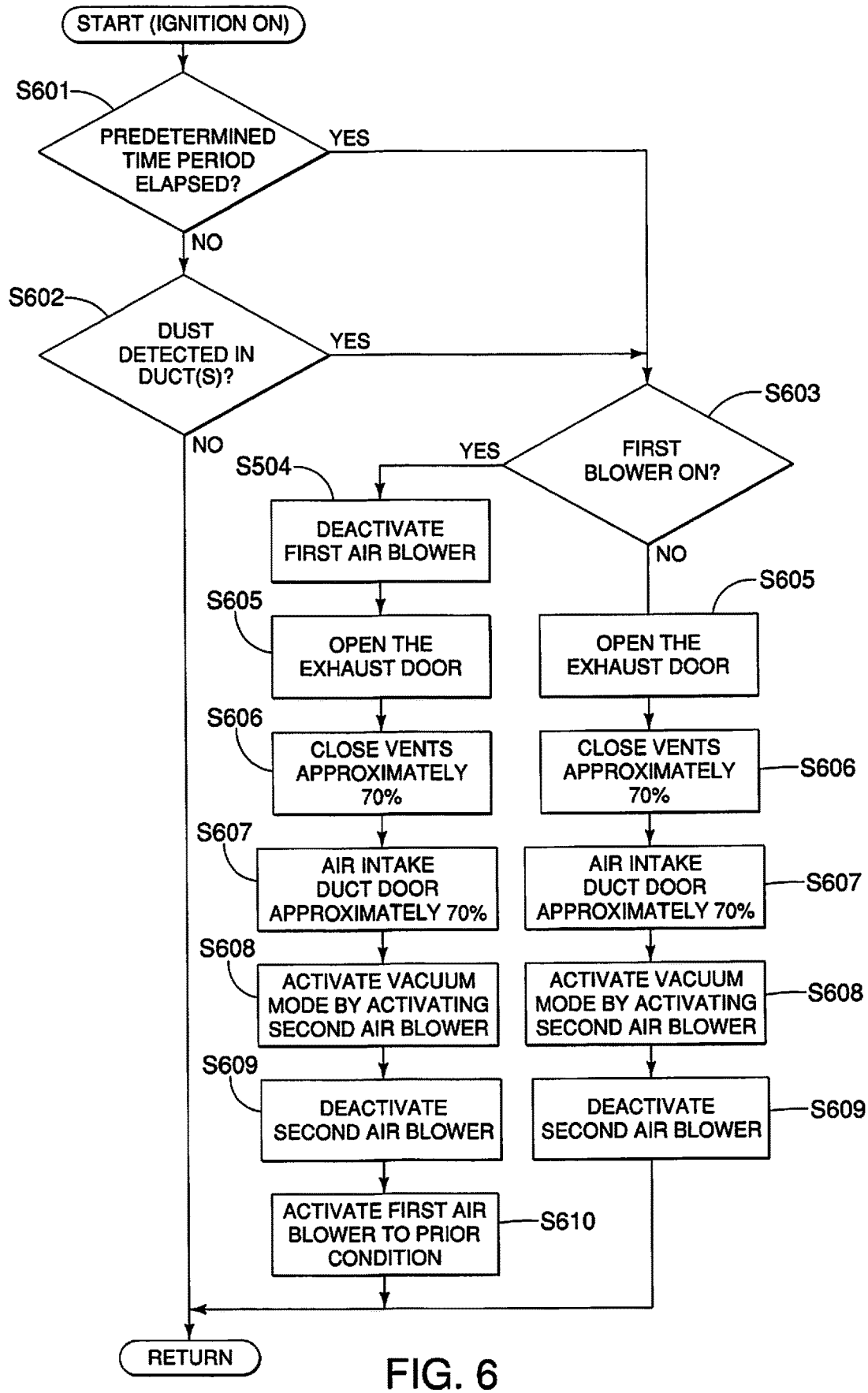
FIG. 6 is a flow chart of an alternative vacuuming mode executed by the electronic controller of the electronic control system of the vehicle air handling system illustrated FIG. 4.

Referring now to FIG. 6, the first alternative cleaning mode will now be discussed. Basically, in the first alternative cleaning mode, the electronic controller 34 operates the second air blower 28 to expel particulates through the exhaust outlet 40 and into the particulate storage 42. As shown, steps S601 to S604 are identical to steps S501 to S504 of the second (cleaning) mode and will not be further discussed for brevity.

In step S605, the electronic controller 34 opens the exhaust door 40A to open the exhaust outlet 40 via actuation of the exhaust door actuator 40B. In step S606, the electronic controller 34 closes the passenger compartment vents V1, V2 and V3 similar to the second (cleaning) mode. In step S607, the electronic controller 34 partially closes the air inlet 38 via actuation of the air intake door actuator 38B to close the air intake door 38A. In the illustrated embodiment, the air intake door 38A is closed approximately 70 percent to increase the speed of air flow in the ducts during vacuuming. However, it will be apparent to those skilled in the vehicle field from this disclosure that the air inlet 38 can be closed at a variety of degrees as needed and/or desired. It will be further apparent to those skilled in the vehicle field from this disclosure that the air inlet 38 should be kept partially open in order to intake air into the ducts D1 to D5 for vacuuming.

In step S608, the electronic controller 34 activates the second air blower 28. The second air blower 28 blows in a rotational direction such that air flows into the air duct housing 24 via the air inlet 38 to expel particulates through the exhaust outlet 40 into the particulate storage 42. After a predetermined period that can be factory set as desired, the electronic controller 34 deactivates the second air blower 28 in step S609. In step S610, the electronic controller 34 returns the first air blower 26 to the condition prior to vacuuming. That is, the HVAC unit 22 returns to its previous operational state (heating or cooling) prior to vacuuming.

In the illustrated embodiment, the vehicle air handling system 12 can additionally include a second alternative cleaning mode. In the second alternative cleaning mode, both the first and second air blowers 26 and 28 are activated. In particular, the second alternative cleaning mode is identical to the first alternative cleaning mode, however, the first air blower 26 is activated to blow in the first rotational direction (i.e., not reversing the rotational direction if the first air blower 26) to blow air through the exhaust outlet 40. Thus, in the second alternative cleaning mode, there is no step to deactivate the first air blower 26. In the second alternative cleaning mode, both the first and second blowers are utilized in combination to increase the air flow in the ducts D1 to D5 during vacuuming.

As previously mentioned, the electronic controller 34 is configured to enable selective vacuuming or vacuuming of the ducts D3 to D5 in phases. In particular, the vehicle air handling system 12 can vacuum the panel ducts D3, the floor ducts D4 and defrost duct D5 one at a time to ensure thorough vacuuming by increasing the air flow through the selected area that is being vacuumed. Also, as previously mentioned, the electronic controller 34 controls the mode door(s) to selectively close off the panel ducts D3, the floor ducts D4 and the defrost duct D5 during vacuuming. Preferably, the electronic controller 34 is configured to control the mode door actuator such that the mode door closes the floor ducts D4 and defrost duct D5 to first vacuum the panel ducts D3. The electronic controller 34 is configured to then close the mode door to close the panel ducts D3 and the defrost duct D5 to vacuum the floor ducts D4. The electronic controller 34 is configured to control the mode door to close the panel ducts D3 and the floor ducts D4 to vacuum the defrost duct D5. Thus, the electronic controller 34 is preferably configured to vacuum from the panel ducts D3, then the floor ducts D4 and then the defrost duct D5. However, it will be apparent to those skilled in the vehicle field from this disclosure that the electronic controller 34 can be configured to vacuum the ducts D3 to D5 in a variety of stages as needed and/or desired.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "pert," "section," "portion," "member" or "element" when used in the singular can have the dual meaning of a single part or a plurality of parts. Also as used herein to describe the above embodiment(s), the following directional terms "forward", "rearward" as well as any other similar directional terms refer to those directions of a vehicle equipped with the vehicle air handling system. Accordingly, these terms, as utilized to describe the present invention should be interpreted relative to a vehicle equipped with the vehicle air handling system.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle air handling system comprising:
   an air duct housing having an air inlet and a passenger compartment vent;
   a particulate sensor configured to detect a particulate level of particulates in the air duct housing;
   a first air blower disposed in the air duct housing to move air within the air duct housing, the first air blower moving air in an air direction toward the passenger compartment vent; and
   an electronic controller operatively coupled to the particulate sensor and the first air blower, the electronic controller being configured to operate the first air blower to reverse the air direction of the first air blower upon detection of the particulate level of the particulates in the air duct housing being equal to or greater than a predetermined particulate threshold level in the air duct housing.

2. The vehicle air handling system according to claim 1, further comprising
   a second air blower disposed in an exhaust duct of the air duct housing and operatively coupled to the electronic controller, the exhaust duct being disposed downstream of the air inlet with respect to an air intake direction, the electronic controller being configured to operate the second air blower to draw air through the exhaust duct and out an exhaust outlet upon detection of the particulate level of the particulates in the air duct being equal to or greater than the predetermined particulate threshold level.

3. The vehicle air handling system according to claim 2, further comprising
   a particulate storage disposed adjacent the exhaust outlet of the exhaust duct.

4. The vehicle air handling system according to claim 2, wherein
   the air inlet includes an air intake door and an air intake door actuator configured to operate the air intake door, the electronic controller being configured to operate the air intake door actuator to partially close the air intake door upon detection of the particulate level of the particulates in the air duct housing being equal to or greater than the predetermined particulate threshold level of particulates.

5. The vehicle air handling system according to claim 4, wherein
   the exhaust outlet includes an exhaust duct door and an exhaust door actuator, the electronic controller being configured to operate the exhaust duct door actuator to open the exhaust duct door upon detection of the particulate level of the particulates in the air duct housing being equal to or greater than the predetermined particulate threshold level of particulates.

6. The vehicle air handling system according to claim 5, wherein
   the exhaust outlet is disposed in a vehicle dash instrument panel.

7. The vehicle air handling system according to claim 1, wherein
   the electronic controller is configured to activate the particulate sensor to begin detecting particulates upon activation of a vehicle ignition.

8. The vehicle air handling system according to claim 7, further comprising
at least one additional passenger compartment vent and at least one additional particulate sensor disposed adjacent the at least one additional passenger compartment vent.

9. The vehicle air handling system according to claim 1, wherein
the air duct housing includes at least one panel duct, at least one floor duct and at least one defrost duct,
the air duct housing has at least one mode door and at least one mode door actuator configured to operate the at least one mode door, and
the electronic controller is configured to selectively operate the at least one mode door actuator so that the first blower selectively vacuums particulates from the panel duct, the floor duct and the defrost duct.

10. A vehicle air handling system comprising:
an air duct housing having an air inlet and a passenger compartment vent;
a particulate sensor configured to detect a particulate level of particulates in the air duct housing;
an exhaust duct blower disposed in the air duct housing to draw air through the air duct housing and out an exhaust duct of the air duct housing; and
an electronic controller operatively coupled to the particulate sensor and the exhaust duct blower, the electronic controller device being configured to operate the exhaust duct blower upon detection the particulate level of the particulates in the air duct housing being equal to or greater than a predetermined particulate threshold level in the air duct housing.

11. The vehicle air handling system according to claim 10, further comprising
a particulate storage disposed adjacent the exhaust outlet of the exhaust duct.

12. The vehicle air handling system according to claim 10, wherein
the air inlet includes an air intake door and an air intake door actuator configured to operate the air intake door, the electronic controller being configured to operate the air intake door actuator to partially close the air intake door upon detection of the particulate level of the particulates in the air duct housing being equal to or greater than the predetermined particulate threshold level of particulates.

13. The vehicle air handling system according to claim 10, wherein
the exhaust outlet includes an exhaust duct door and an exhaust door actuator, the electronic controller being configured to operate the exhaust duct door actuator to open the exhaust duct door upon detection of the particulate level of the particulates in the air duct housing being equal to or greater than the predetermined particulate threshold level of particulates.

14. The vehicle air handling system according to claim 13, wherein
the exhaust outlet is disposed in a vehicle dash instrument panel.

15. The vehicle air handling system according to claim 10, wherein
the electronic controller is configured to activate the particulate sensor to begin detecting particulates upon activation of a vehicle ignition.

16. The vehicle air handling system according to claim 10, further comprising
at least one additional passenger compartment vent and at least one additional particulate sensor disposed adjacent the at least one additional passenger compartment vent.

17. The vehicle air handling system according to claim 10, wherein
the air duct housing includes at least one panel duct, at least one floor duct and at least one defrost duct,
the air duct housing has at least one mode door and at least one mode door actuator configured to operate the at least one mode door, and
the electronic controller is configured to selectively operate the at least one mode door actuator so that the exhaust duct blower selectively vacuums particulates from the panel duct, the floor duct and the defrost duct.

18. A vehicle air handling system comprising:
an air duct housing having an air inlet and a passenger compartment vent;
a cowl box including a cowl body panel opening aligned with the air inlet,
a first air blower disposed in the air duct housing to move air within the air duct housing; and
an electronic controller operatively coupled to the first air blower, the electronic controller being configured to operate in a first mode in which the first air blower pulls air from the cowl body panel opening through the air duct housing to the passenger compartment, the electronic controller being configured to operate in a second mode in which the first air blower pulls air from the passenger compartment through the air duct housing to the cowl body panel opening.

19. The vehicle air handling system according to claim 18, wherein
the electronic controller is configured to operate in the second mode upon activation of a vehicle ignition and determining that a predetermined time period has lapse since operating the second mode.

20. The vehicle air handling system according to claim 18, further comprising
a particulate sensor configured to detect a particulate level of particulates in the air duct housing;
the electronic controller being configured to operate in the second mode upon detection of the particulate level of the particulates in the air duct housing being equal to or greater than a predetermined particulate threshold level in the air duct housing.

* * * * *